(12) United States Patent
Yi et al.

(10) Patent No.: US 9,581,852 B2
(45) Date of Patent: Feb. 28, 2017

(54) COLOR FILTER SUBSTRATE, DISPLAY PANEL AND DISPLAY DEVICE

(71) Applicants: CHENGDU BOE OPTOELECTRONICS TECHNOLOGY CO., LTD., Chengdu, Sichuan (CN); BOE TECHNOLOGY GROUP CO., LTD., Beijing (CN)

(72) Inventors: Shitian Yi, Beijing (CN); Haoyuan Fan, Beijing (CN); Xiangfu Jin, Beijing (CN); Lyul Yun Hwang, Beijing (CN)

(73) Assignees: CHENGDU BOE OPTOELECTRONICS TECHNOLOGY CO., LTD., Chengdu, Sichuan Province (CN); BOE TECHNOLOGY GROUP CO., LTD., Beijing (CN)

( * ) Notice: Subject to any disclaimer, the term of this patent is extended or adjusted under 35 U.S.C. 154(b) by 91 days.

(21) Appl. No.: 14/348,707

(22) PCT Filed: Jun. 18, 2013

(86) PCT No.: PCT/CN2013/077425
§ 371 (c)(1),
(2) Date: Mar. 31, 2014

(87) PCT Pub. No.: WO2014/153857
PCT Pub. Date: Oct. 2, 2014

(65) Prior Publication Data
US 2015/0293401 A1    Oct. 15, 2015

(30) Foreign Application Priority Data

Mar. 26, 2013  (CN) .......................... 2013 1 0098508

(51) Int. Cl.
*G02B 5/22*        (2006.01)
*G02F 1/1335*      (2006.01)
*G02B 5/20*        (2006.01)

(52) U.S. Cl.
CPC ....... *G02F 1/133514* (2013.01); *G02B 5/201* (2013.01); *G02F 1/133512* (2013.01)

(58) Field of Classification Search
CPC .......... G02B 5/28; G02B 5/287; G02B 1/111; G02B 5/201; G02B 5/22; G02B 5/003;
(Continued)

(56) References Cited

U.S. PATENT DOCUMENTS 6,867,549 B2 * 3/2005 Cok ..................... G09G 3/3216
                                               315/169.3
2006/0262262 A1 * 11/2006 Kim .................. G02F 1/134309
                                               349/139
(Continued)

FOREIGN PATENT DOCUMENTS

CN    101349845 A    1/2009
CN    202041673 U    11/2011
(Continued)

OTHER PUBLICATIONS

Second Chinese Office Action dated Jul. 7, 2015; Appln. No. 201310098508.5.
(Continued)

*Primary Examiner* — Jade R Chwasz
(74) *Attorney, Agent, or Firm* — Ladas & Parry LLP

(57) ABSTRACT

A color filter substrate, a display panel and a display device are provided. The color filter substrate includes a substrate and a color filter layer provided on the substrate. The color filter layer includes a plurality of pixel units in a matrix form, each of the pixel units includes at least three subpixels in different colors, and each of the subpixels includes a sub-subpixel in one color. Within each of the pixel units, areas of the sub-subpixels are inversely proportional to wavelengths that the sub-subpixels correspond to.

10 Claims, 4 Drawing Sheets

(58) Field of Classification Search
CPC ...... G02B 5/286; G02B 5/20; C03C 17/3417; C03C 17/36; C03C 17/42; C03C 17/23; C03C 17/34; C03C 17/3429; C03C 17/3618; C03C 2217/213; C03C 3/112; G02F 1/133514; G02F 1/133512; G02F 1/133516; G02F 2201/52; G02F 1/13394; G02F 2001/133357; G02F 2001/134345; G02F 1/134336; G02F 1/1362
USPC ....... 359/885, 891, 892, 580, 581, 586, 588, 359/589, 590
See application file for complete search history.

(56) References Cited

U.S. PATENT DOCUMENTS

2010/0102283 A1* 4/2010 Royster, Jr. ......... C09B 47/0671
 252/586
2012/0287382 A1 11/2012 Qi et al.

FOREIGN PATENT DOCUMENTS

CN 202126515 U 1/2012
CN 102778781 A 11/2012

OTHER PUBLICATIONS

First Chinese Office Action Appln. No. 201310098508.5; Dated Jan. 15, 2015.
International Search Report mailed Sep. 1, 2014; PCT/CN2013/077425.
Third Chinese Office Action Appln. No. 201310098508.5; Dated Dec. 16, 2015.
International Preliminary Report on Patentability Appln. No. PCT/CN2013/077425; Dated Sep. 29, 2015.

* cited by examiner

COLOR FILTER SUBSTRATE, DISPLAY PANEL AND DISPLAY DEVICE

TECHNICAL FIELD

Embodiments of the invention relate to a color filter substrate, a display panel and a display device.

BACKGROUND

Liquid crystal display (LCD) dominates the flat-panel display market due to its advantages of high image quality, small size, low drive voltage, low power consumption, low impact on human eyes and the like. A conventional liquid crystal display comprises an array substrate, a color filter substrate and a liquid crystal filled between the array substrate and the color filter substrate. As shown in FIG. 1 and FIG. 2, the color filter substrate comprises a substrate 1, and a black matrix layer 2 and a color filter layer 3 provided on the substrate 1. The color filter layer 3 comprises a plurality of pixel units in a matrix form. Each pixel unit comprises a red subpixel 31, a green subpixel 32 and a blue subpixel 33, and a black matrix in the black matrix layer 2 is provided between adjacent subpixels to prevent light from leaking at a boundary between adjacent subpixels. The liquid crystal display can display various colors by modulating red light, green light and blue light, and in this way, the liquid crystal display can display a colorful image. Therefore, the color filter substrate is a key component of the liquid crystal display.

As shown in FIG. 1 and FIG. 2, the subpixels 31, 32 and 33 in the conventional color filter substrate are all designed to be rectangular and be equal in length and width. Red light, green light and blue light are different in wavelength, the subpixel corresponding to the light with longer wavelength is widened due to illusion of human eyes, and thus "chromatic aberration" occurs. That is, although the subpixels 31, 32 and 33 of three colors are designed to have the same shape and size, they have different widths on visual sense due to illusion of human eyes, to be exact, a width of the red subpixel is visually greater than a width of the green subpixel and the width of the green subpixel is visually greater than a width of the blue subpixel, thus chromatic aberration is resulted and image quality of the display device is degraded.

SUMMARY OF THE INVENTION

According to one aspect of the invention, there is provided a color filter substrate. The color filter substrate comprises a substrate and a color filter layer provided on the substrate. The color filter layer comprises a plurality of pixel units in a matrix form, each of the pixel units comprises at least three subpixels in different colors, and each of the subpixels comprises a sub-subpixel in one color. Within each of the pixel units, areas of the sub-subpixels are inversely proportional to wavelengths that the sub-subpixels correspond to.

According to another aspect of the invention, there is provided a display panel. The display panel comprises the color filter substrate mentioned above.

According to still another aspect of the invention, there is provided a display device. The display device comprises the display panel mentioned above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

Figure 1:
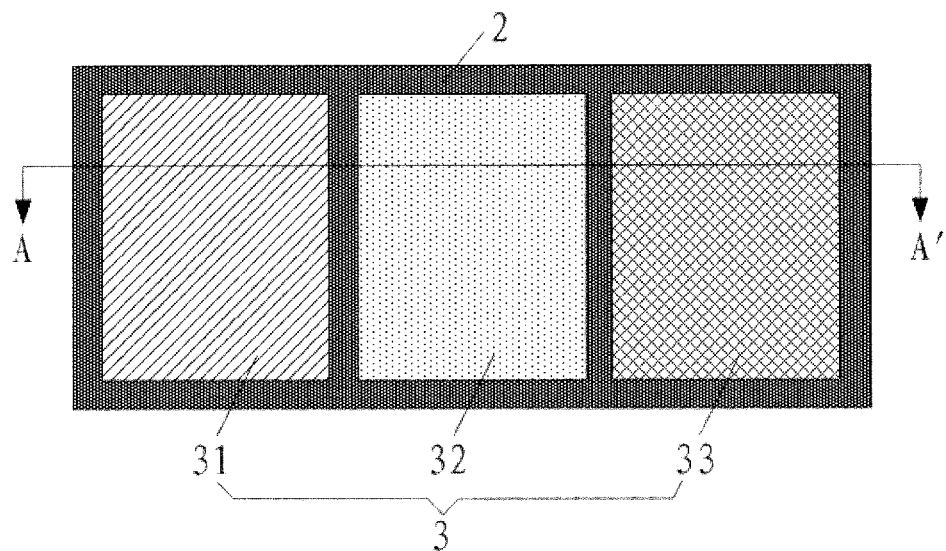
FIG. 1 is a partial enlarged schematic view illustrating a color filter substrate in a conventional technology.
Figure 2:
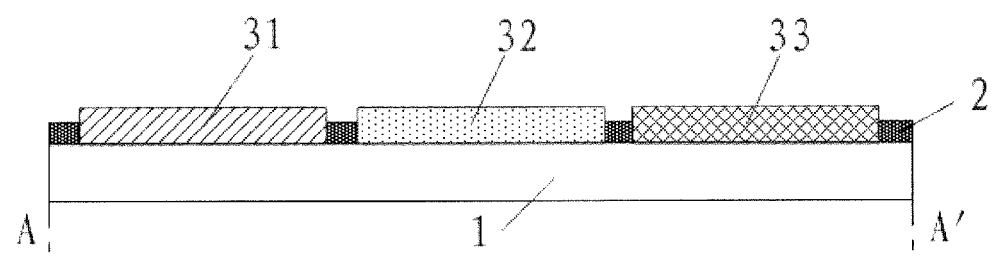
FIG. 2 is a sectional schematic view taken along line A-A' of FIG. 1.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

An embodiment of the invention provides a color filter substrate, and the color filter substrate comprises a substrate and a color filter layer provided on the substrate. The color filter layer comprises a plurality of pixel units in a matrix form. Each pixel unit comprises at least three subpixels in different colors, and each of the subpixels comprises a sub-subpixel in one color. Within each of the pixel units, areas of the sub-subpixels are inversely proportional to wavelengths that the sub-subpixels correspond to.

It should be noted that, in the case that the subpixel merely comprises one sub-subpixel, the sub-subpixel is just the subpixel. At this time, each pixel unit comprising at least three subpixels in different colors means that each pixel unit comprises at least three sub-subpixels in different colors. Among the at least three sub-subpixels in different colors, adjacent sub-subpixels may closely adjoin with each other. Alternatively, among the at least three sub-subpixels in different colors, adjacent sub-subpixels may overlap with each other at a boundary between the adjacent sub-subpixels so as to prevent light from leaking at the boundary between the sub-subpixels. In the embodiment of the invention, as an example, each pixel unit comprises a red sub-subpixel, a green sub-subpixel and a blue sub-subpixel. It should be noted that, each pixel unit may comprise sub-subpixels in other colors than red, green and blue. In the case that each pixel unit of the color filter substrate comprises sub-subpixels in other colors, the sub-subpixels in other colors can be arranged according to the principle of the embodiment of the invention, and details thereof are omitted here. For example, the color filter layer is made of resin. In addition, the color filter layer may be made of other materials, such as inorganic material and the like. Hereinafter, the embodiment of the invention is described by taking the case that the resin is used to form the color filter layer as an example.

In all the embodiments of the invention, the "film" is formed by a material on the substrate through deposition or other processes. The "film" can be called as "layer" if the "film" is not patterned in the entire manufacturing process; otherwise, the "film" is called as "film" before the patterning process and is called as "layer" after the patterning process. The "layer" after the patterning process comprises at least one "pattern" of the film. For example, the color filter layer is formed by a resin thin film through a patterning process and comprises the sub-subpixel pattern.

Figure 3:
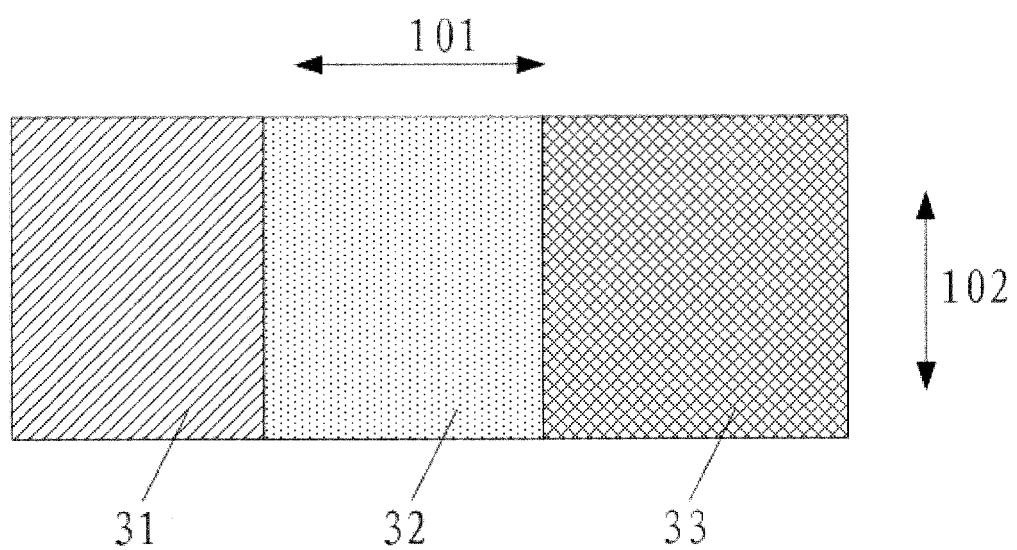
FIG. 3 is a partial enlarged schematic view illustrating a color filter substrate according to an embodiment of the invention.

As shown in FIG. 3, each pixel unit of the color filter substrate comprises the red sub-subpixel 31, the green sub-subpixel 32 and the blue sub-subpixel 33. Because a wavelength of the red light is greater than a wavelength of the green light and the wavelength of the green light is greater than a wavelength of the blue light, an area S1 of the red sub-subpixel 31 is smaller than an area S2 of the green sub-subpixel 32 and the area S2 of the green sub-subpixel 32 is smaller than an area S3 of the blue sub-subpixel 33. For example, S1:S2:S3=(0.89-0.94):(0.95-0.99):1. In consideration of visual sensitivity and visual error of human eyes, the red sub-subpixel 31, the green sub-subpixel 32 and the blue sub-subpixel 33 visually have a same width in the case that the area of the red sub-subpixel, the area of the green sub-subpixel and the area of the blue sub-subpixel satisfy the relationship mentioned above. Central wavelengths of lights that respectively pass through the red resin, the green resin and the blue resin are 650 nm, 550 nm and 460 nm, therefore it is preferable that S1:S2:S3=0.93:0.96:1. The visual width of the sub-subpixel is proportional to the wavelength of the sub-subpixel, and the above area ratio of the subpixels in various colors is obtained by calculating the reciprocals of wavelengths of the sub-subpixels and taking the reciprocal of the wavelength of the blue sub-subpixel as the reference value of "1". The optimal visual effect can be achieved in the case that the area of the red sub-subpixel, the area of the green sub-subpixel and the area of the blue sub-subpixel satisfy the relationship S1:S2:S3=0.93:0.96:1.

In the color filter substrate according to the embodiment of the invention, the areas of the sub-subpixels in various colors are inversely proportional to the wavelengths that the sub-subpixels correspond to. Thus, the chromatic aberration caused by the colors of the sub-subpixels can be avoided, so that the sub-subpixels can visually have an equal width and the display effect can be improved.

For example, the sub-subpixels within each pixel unit are rectangular and are equal in length. Specifically, the pixel units are provided in the matrix form and the sub-subpixels are equal in length. Accordingly, in the case that the areas of the sub-subpixels in each of the pixel units are inversely proportional to wavelengths that the sub-subpixels correspond to, the sub-subpixels are different in width. That is, the width of the sub-subpixel corresponding to a longer wavelength is smaller than that of the sub-subpixel corresponding to a shorter wavelength. As shown in FIG. 3, in a vertical direction, the sub-subpixels are equal in length; and in a horizontal direction, the width of the red sub-subpixel 31 is smaller than the width of the green sub-subpixel 32 and the width of the green sub-subpixel 32 is smaller than the width of blue sub-subpixel 33. In the embodiment of the invention, as an example, the length is along the vertical direction 102 and the width is along the horizontal direction 101.

Figure 4:
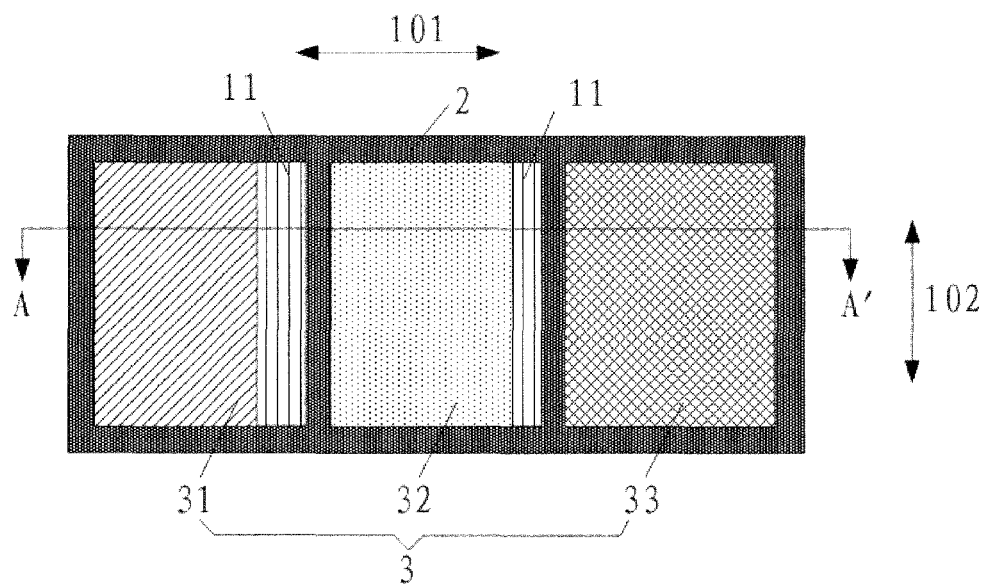
FIG. 4 is a partial enlarged schematic view illustrating another color filter substrate according to an embodiment of the invention.
Figure 5:
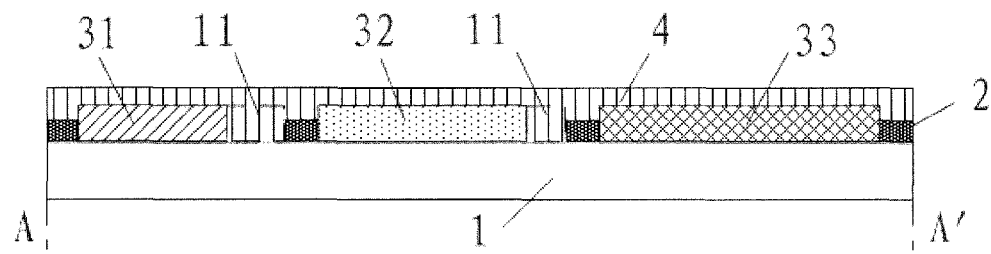
FIG. 5 is a sectional schematic view taken along line A-A' of FIG. 4.

For example, in each pixel unit, at least the subpixel corresponding to the longer wavelength further comprises a brightening sub-subpixel, and the brightening sub-subpixel closely adjoins with the sub-subpixel in one color in the subpixel. The brightening sub-subpixel may be a transparent sub-subpixel or a white sub-subpixel. Of course, the brightening sub-subpixel may also be a yellow sub-subpixel or a sub-subpixel in other colors. Preferably, the brightening sub-subpixel is the transparent sub-subpixel, so as to improve the transmittance and enhance the brightness of the color filter substrate. The embodiment of the invention is described in detail by taking the case that the brightening sub-subpixel is the transparent sub-subpixel as an example. As shown in FIG. 4 and FIG. 5, since the red light and the green light have the wavelength longer than that of the blue light, the red subpixel and the green subpixel respectively comprise the transparent sub-subpixel 11. The transparent sub-subpixel provided on the color filter substrate can enhance the brightness of the color filter substrate because of the high transmittance of the transparent sub-subpixel. Accordingly, the color filter substrate can obtain a more natural color mixture, and the display effect can be enhanced.

For example, the subpixels are equal in area in the case that the brightening sub-subpixel is provided as described above. As shown in FIG. 4, the area of the red subpixel, the area of the green subpixel and the area of the blue subpixel are equal with each other. Specifically, a sum of the areas of the red sub-subpixel 31 and the transparent sub-subpixel 11 of the red subpixel is equal to a sum of the areas of the green sub-subpixel 32 and the transparent sub-subpixel 11 of the green subpixel, and is equal to the area of the blue sub-subpixel 33. In the case that the color filter substrate further comprises a black matrix layer, the black matrix layer can be easily formed when the subpixels are equal in area.

For example, as shown in FIG. 4 and FIG. 5, the color filter substrate further comprises the black matrix layer 2. The black matrix layer 2 comprises a black matrix, and the black matrix is provided at a position that adjacent subpixels adjoin with each other. The black matrix provided at the position that adjacent subpixels adjoin with each other can prevent light from leaking at this position. It should be noted that, the black matrix layer may be provided above or below the color filter layer. In the embodiment of the invention, the position of being "above" and "below" is determined depending on the sequence of forming the thin films, exactly, the thin film formerly formed is provided "below" and the thin film formed later is provided "above".

Figure 6:
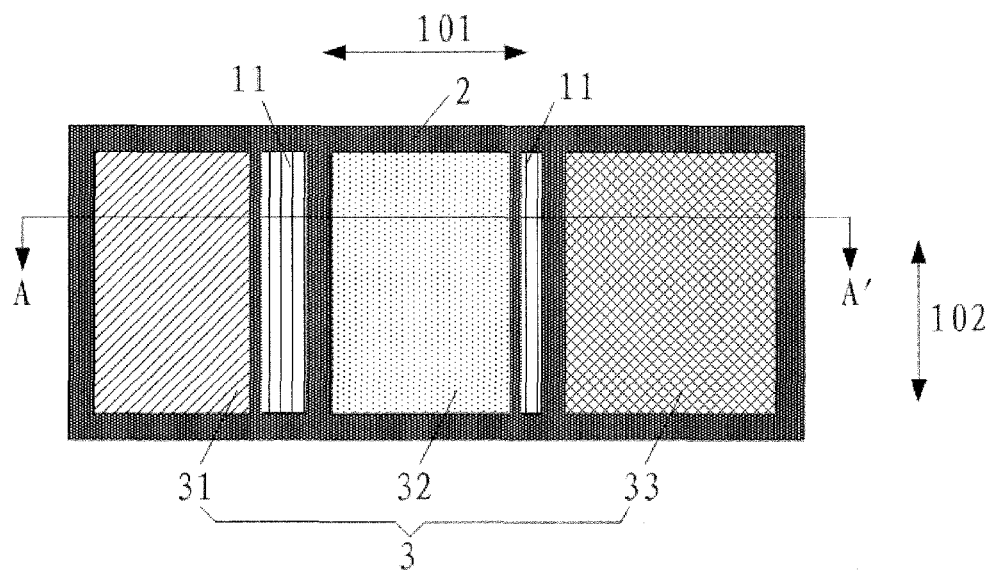
FIG. 6 is a partial enlarged schematic view illustrating another color filter substrate according to an embodiment of the invention.
Figure 7:
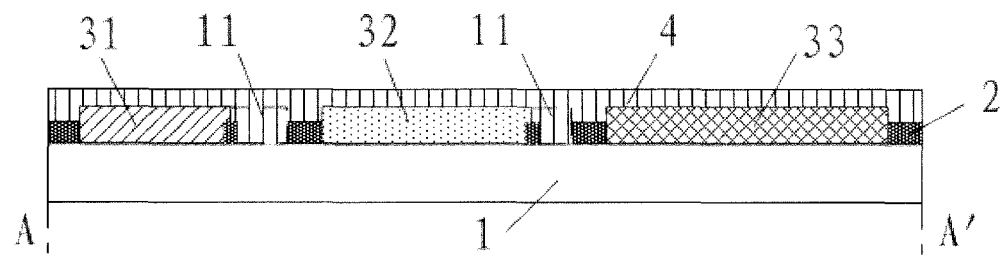
FIG. 7 is a sectional schematic view taken along line A-A' of FIG. 6.

As shown in FIG. 6 and FIG. 7, the black matrix is further provided at a position that the sub-subpixel and the brightening sub-subpixel adjoin with each other, so as to prevent light from leaking at the position that the sub-subpixel and the brightening sub-subpixel adjoin with each other.

Figure 8:
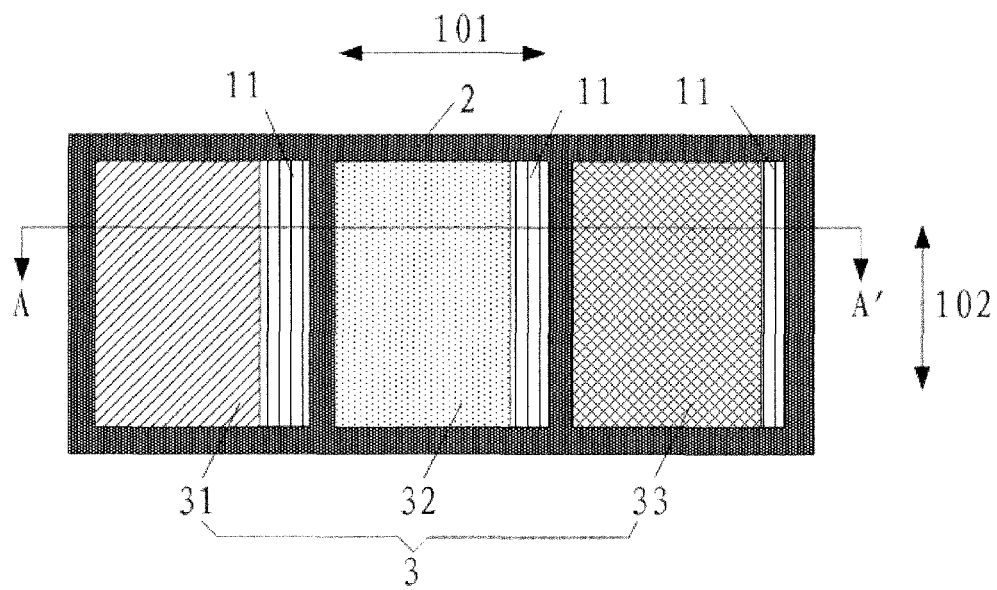
FIG. 8 is a partial enlarged schematic view illustrating another color filter substrate according to an embodiment of the invention.
Figure 9:
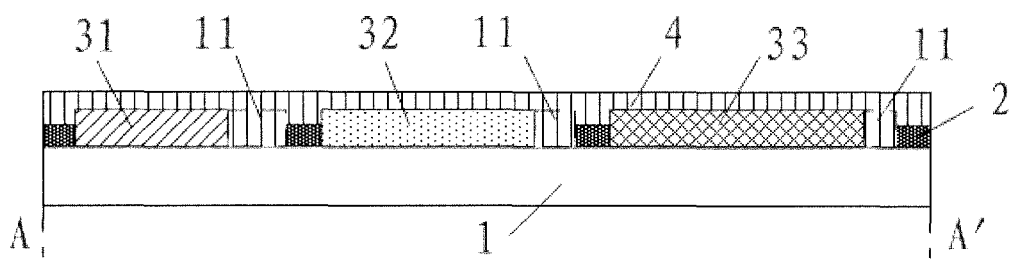
FIG. 9 is a sectional schematic view taken along line A-A' of FIG. 8.

For example, in each pixel unit, each of the subpixels comprises the brightening sub-subpixel. Within each of the subpixels, the brightening sub-subpixel closely adjoins with sub-subpixel in one color. Specifically, as shown in FIG. 8 and FIG. 9, the red subpixel, the green subpixel and the blue subpixel comprise the transparent sub-subpixel 11, respectively. In the red subpixel, the transparent sub-subpixel 11 closely adjoins with the red sub-subpixel 31. In the green subpixel, the transparent sub-subpixel 11 closely adjoins with the green sub-subpixel 32. In the blue subpixel, the transparent sub-subpixel 11 closely adjoins with the blue sub-subpixel 33.

For example, the subpixels are equal in area in the case that the brightening sub-subpixel is provided as described above. As shown in FIG. 8, the area of the red subpixel, the area of the green subpixel and the area of the blue subpixel are equal with each other. Specifically, a sum of the areas of the red sub-subpixel 31 and the transparent sub-subpixel 11 of the red subpixel is equal to a sum of the areas of the green sub-subpixel 32 and the transparent sub-subpixel 11 of the green subpixel, and is equal to a sum of the areas of the blue sub-subpixel 33 and the transparent sub-subpixel 11 of the blue subpixel. The transparent sub-subpixel provided on the color filter substrate can enhance the brightness of the color filter substrate because of the high transmittance of the transparent sub-subpixel. Accordingly, the color filter substrate can obtain a more natural color mixture, and the display effect can be enhanced.

For example, the area of the sub-subpixel corresponding to the longest wavelength occupies ⅔ or more than ⅔ of the area of the subpixel. Specifically, as shown in FIG. 4-FIG. 11, the red sub-subpixel 31 corresponds to the longest wavelength and occupies the least area of the subpixel. However, the area of the red sub-subpixel 31 occupies more than ⅔ of the sum of the areas of the red sub-subpixel 31 and the transparent sub-subpixel 11 of the red subpixel, so as to guarantee the display effect of the color filter substrate.

For example, as shown in FIG. 8 and FIG. 9, the color filter substrate further comprises the black matrix layer 2. The black matrix layer 2 comprises the black matrix, and the black matrix is provided at the position that adjacent subpixels adjoin with each other. The black matrix provided at the position that adjacent subpixels adjoin with each other can prevent light from leaking at this position.

Figure 10:
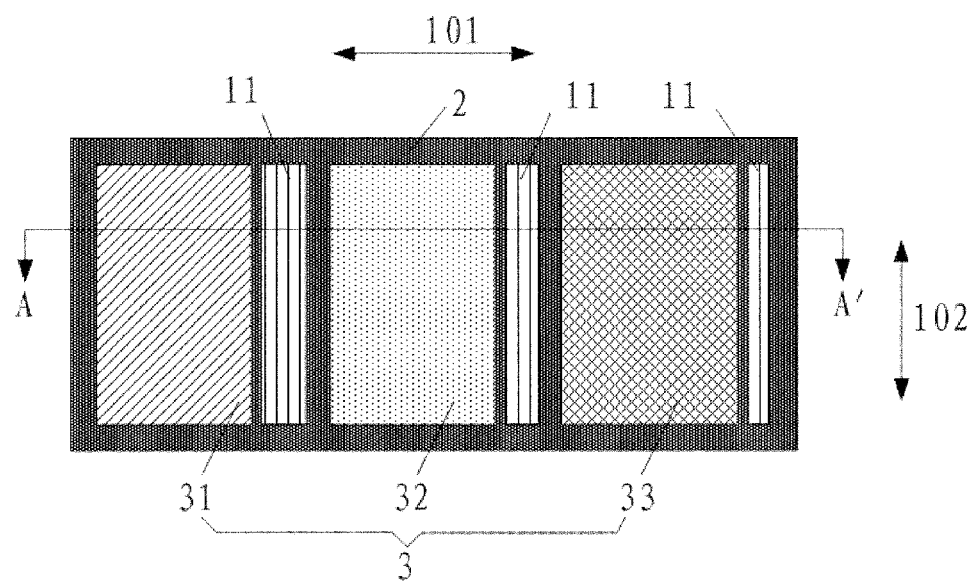
FIG. 10 is a partial enlarged schematic view illustrating another color filter substrate according to an embodiment of the invention.
Figure 11:
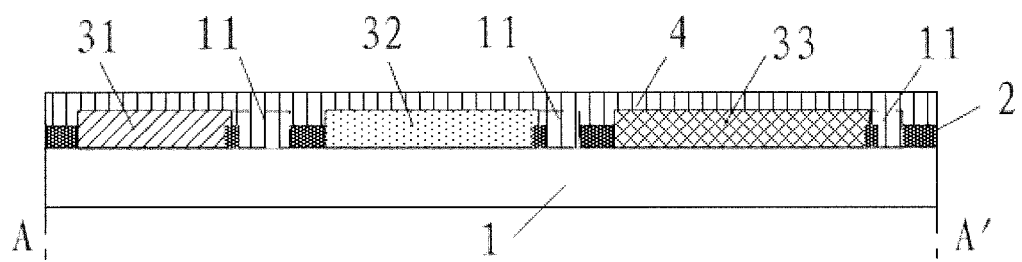
FIG. 11 is a sectional schematic view taken along line A-A' of FIG. 10.

For example, as shown in FIG. 10 and FIG. 11, the black matrix is further provided at the position that the sub-subpixel and the brightening sub-subpixel adjoin with each other, so as to prevent light from leaking at the position that the sub-subpixel and the brightening sub-subpixel adjoin with each other. It should be noted that, the black matrix layer may be provided above or below the color filter layer.

For example, as shown in FIG. 5, FIG. 7, FIG. 9 and FIG. 11, the color filter substrate further comprises a planarization layer 4. For example, the planarization layer 4 is made of a same material as the brightening sub-subpixel. Specifically, the planarization layer is provided above the color filter layer and the black matrix layer. Since the brightening sub-subpixel and the planarization layer are made of same material, the planarization layer and the brightening sub-subpixel may be formed through a same patterning process, i.e., a same exposure process. For example, both the planarization layer and the brightening sub-subpixel are made of resin and are simultaneously formed through processes such as deposition, exposure etc. In this way, the number of manufacturing steps can be reduced, the manufacturing period can be shortened and the manufacturing cost can be decreased. In addition, forming the brightening sub-subpixel and the planarization layer by the same material through the same patterning process can avoid the problem that poor adherence occurs between layers.

For example, the color filter substrate further comprises a transparent conductive layer, and the transparent conductive layer comprises a common electrode. Specifically, the transparent conductive layer is provided in a topmost layer of the color filter substrate.

An embodiment of the invention provides a display panel. The display panel comprises any one of the color filter substrates according to the embodiment of the invention.

An embodiment of the invention provides a display device. The display device comprises the display panel according to the embodiment of the invention. The display device may be display devices such as a liquid crystal display panel, an e-paper etc., or a TV, a digital camera, a mobile phone, a tablet PC comprising these display devices, or any products or components having display function. In addition, the liquid crystal display device may be a vertical electric field mode liquid crystal display device (such as TN (Twist Nematic) or VA (Vertical Alignment) liquid crystal display device), or a horizontal electric field mode liquid crystal display device (such as ADS (Advanced-Super Dimensional Switching) or IPS (In Plane Switch) liquid crystal display device).

The foregoing embodiments merely are exemplary embodiments of the invention, and not intended to define the scope of the invention, and the scope of the invention is determined by the appended claims.

What is claimed is:

1. A color filter substrate, comprising a substrate and a color filter layer provided on the substrate, wherein
    the color filter layer comprises a plurality of pixel units in a matrix form, each of the pixel units comprises at least three subpixels in different colors, and each of the subpixels comprises a sub-subpixel in one color;
    each of the pixel units includes at least three subpixels of different colors, each subpixel includes a sub-subpixel of a color and a brightening sub-subpixel closely adjoins with the sub-subpixel of the color, areas of the sub-subpixels are inversely proportional to corresponding wavelengths of the sub-subpixels to allow the sub-subpixels to visually have equal width.

2. The color filter substrate according to claim 1, wherein within each of the pixel units, the sub-subpixels are rectangular and are equal in length.

3. The color filter substrate according to claim 1, wherein within each of the pixel units, the subpixels are equal in area.

4. The color filter substrate according to claim 1, wherein the brightening sub-subpixel is a transparent sub-subpixel.

5. The color filter substrate according to claim 3, wherein an area of the sub-subpixel corresponding to a longest wavelength occupies more than ⅔ of an area of the subpixel.

6. The color filter substrate according to claim 1, wherein the color filter substrate further comprises a black matrix layer, the black matrix layer comprises a black matrix, and the black matrix is provided at a position that adjacent subpixels adjoin with each other.

7. The color filter substrate according to claim 6, wherein the black matrix is further provided at a position that the sub-subpixel and the brightening sub-subpixel adjoin with each other.

8. The color filter substrate according to claim 1, wherein the color filter substrate further comprises a planarization layer, and the planarization layer is made from a same material as the brightening sub-subpixel.

9. A display panel, comprising the color filter substrate according to claim 1.

10. A display device, comprising the display panel according to claim 9.

* * * * *